US008510176B2

(12) United States Patent
Smith

(10) Patent No.: US 8,510,176 B2
(45) Date of Patent: Aug. 13, 2013

(54) METHOD AND SYSTEM USING SEARCH TERMS TO ACCUMULATE, AGGREGATE AND PRICE DATA FROM A PLURALITY OF DATA ORIGINATORS

(75) Inventor: Stanley Benjamin Smith, Fort Mill, SC (US)

(73) Assignee: Stanley Benjamin Smith, Charlotte, NC (US)

( * ) Notice: Subject to any disclaimer, the term of this patent is extended or adjusted under 35 U.S.C. 154(b) by 158 days.

(21) Appl. No.: 12/930,280

(22) Filed: Jan. 3, 2011

(65) Prior Publication Data

US 2011/0119163 A1    May 19, 2011

(51) Int. Cl.
   *G06Q 30/00*    (2012.01)
(52) U.S. Cl.
   USPC ................ 705/26.5; 705/26.81; 705/27.1
(58) Field of Classification Search
   USPC ..................................... 705/26, 27
   See application file for complete search history.

(56) References Cited

U.S. PATENT DOCUMENTS

| 6,925,607 | B2* | 8/2005 | Szlam et al. | 715/762 |
| 7,574,376 | B1* | 8/2009 | Berman et al. | 705/26.41 |
| 7,725,811 | B1* | 5/2010 | Bedell et al. | 715/200 |
| 2007/0130132 | A1* | 6/2007 | Wu et al. | 707/4 |
| 2008/0015962 | A1* | 1/2008 | Smith | 705/35 |

OTHER PUBLICATIONS

Hyperion: "Hyperion unveils . . . ," PR Newswire, Feb. 24, 2004; Dialog file 613 #01117326, 5pgs.*
Brio: "Brio Pushes Information . . . ," Computergram International, Nov. 5, 1997; Dialog file 16 #0532473, 2 pgs.*
Business Objects: "Business Objects Delivers . . . Platform," Business Wire, May 8, 2005; Dialog file 610 #0001279450, 3pgs.*

* cited by examiner

*Primary Examiner* — Rob Pond

(57) ABSTRACT

A business method that enables a user or owner of one or a plurality of data sources to set fees or other consideration(s) for exchanges and links to a second or a plurality of data sources discovered through Internet searches or other data source discovery methods and integrating the data or the data sources into a data supply chain or federated data source.

10 Claims, 6 Drawing Sheets

The User search terms into a search engine linked to the originating data source on the User's Server.

Policy set(s) establish rules for data collection and pricing; control which Data Sources become part of the data supply chain, establish the method(s) for pushing and pulling data, and exchange or Templates

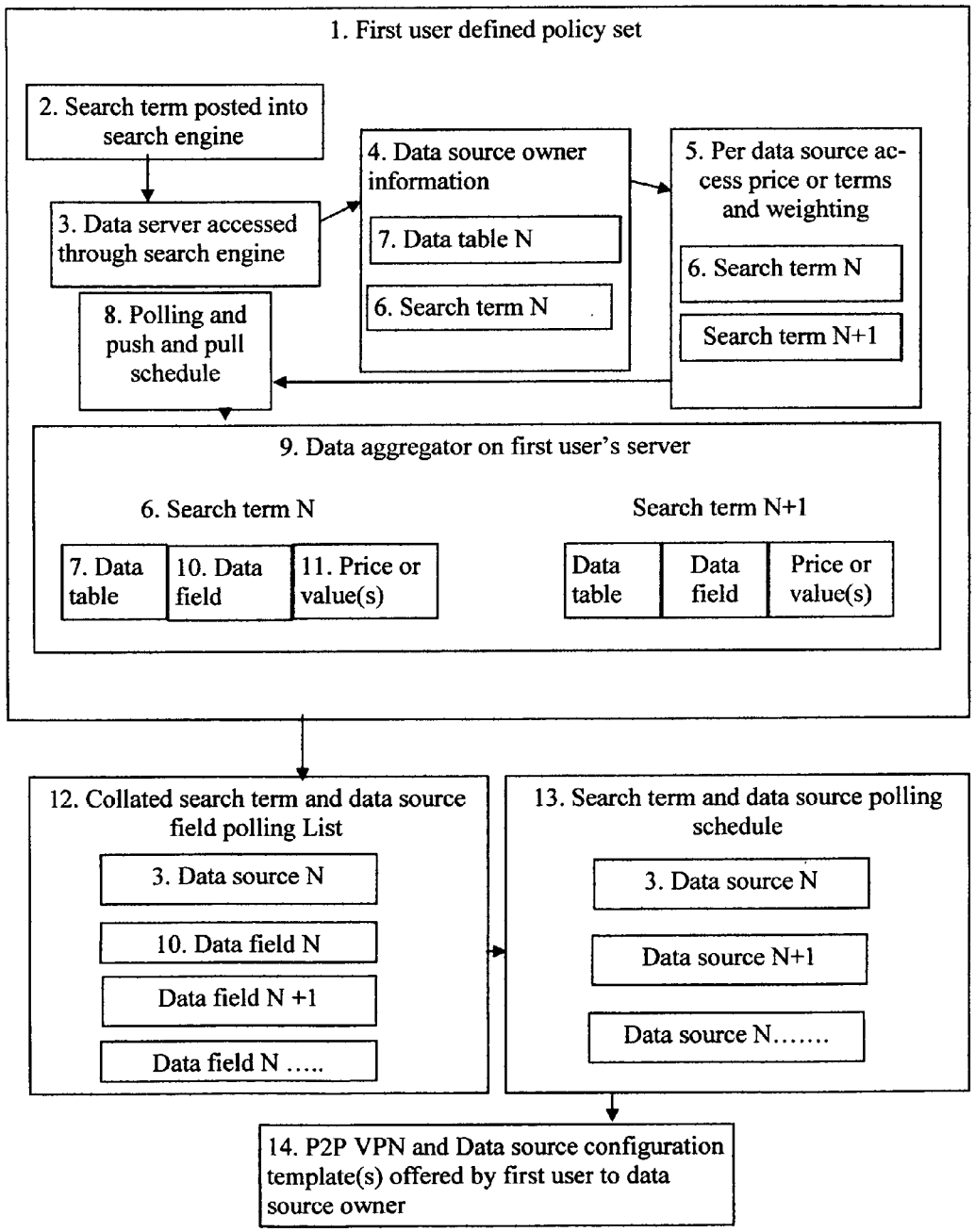
Figure 2. Diagram of First User Activities

Figure 3.     Diagram of User Interactions
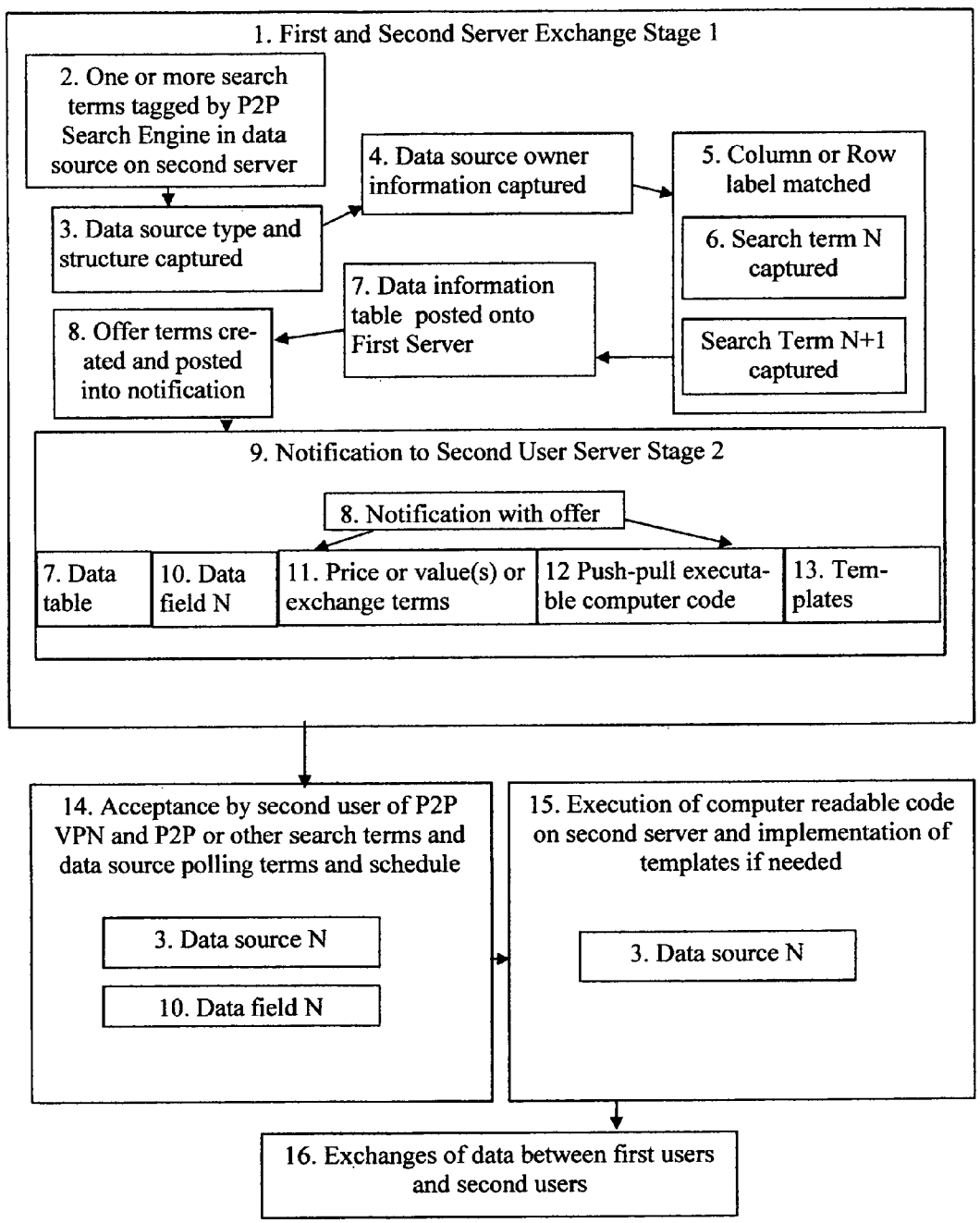

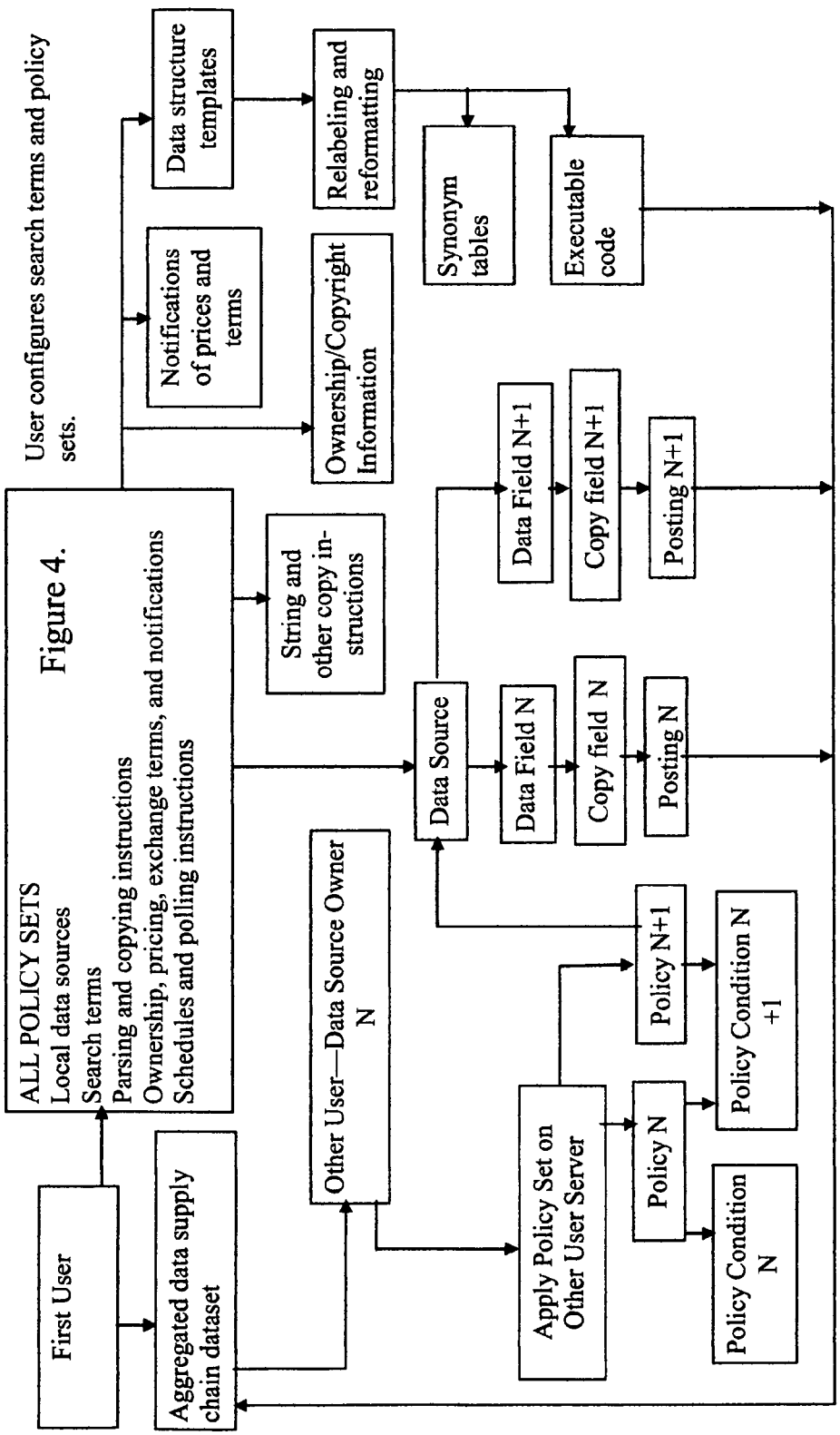

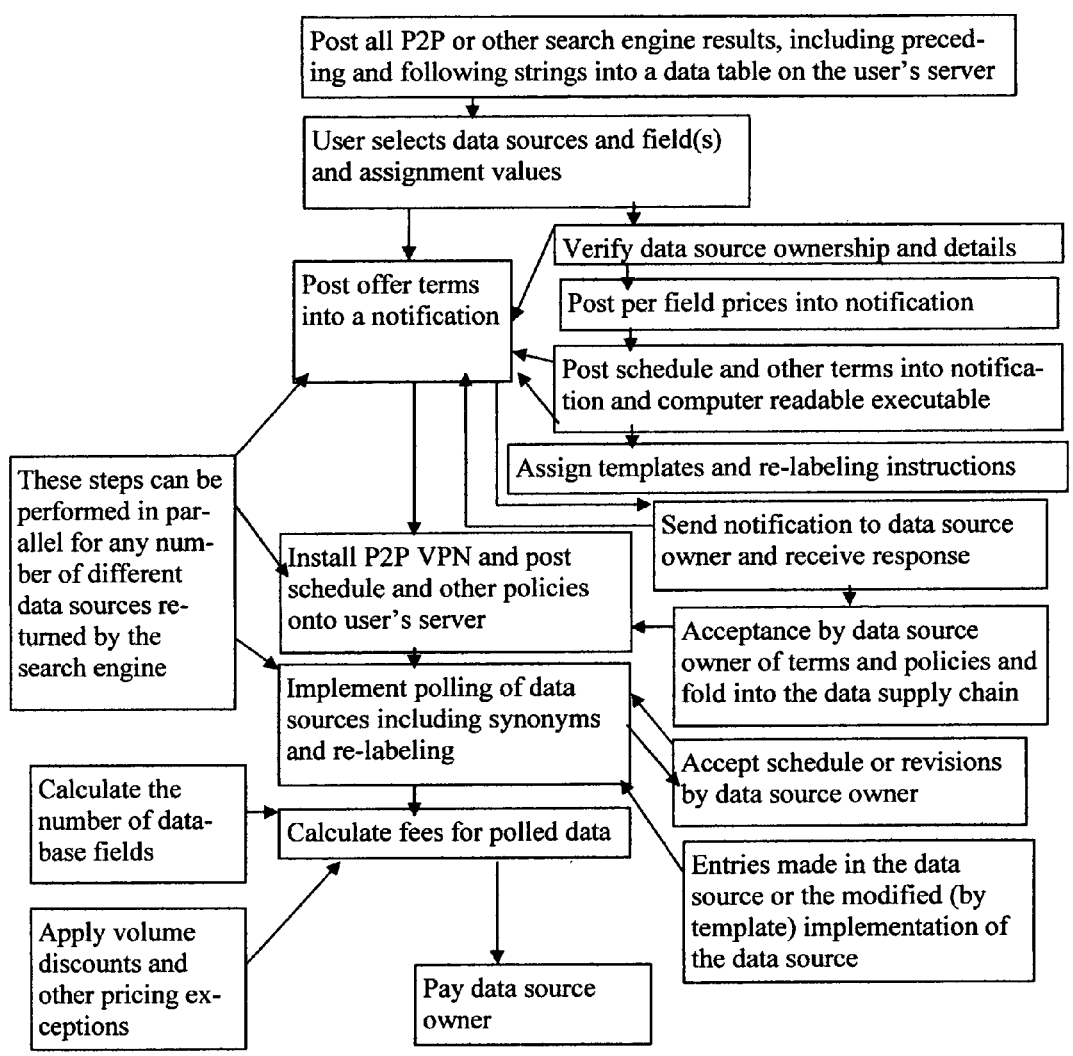
Figure 5.    Pricing and Tasks

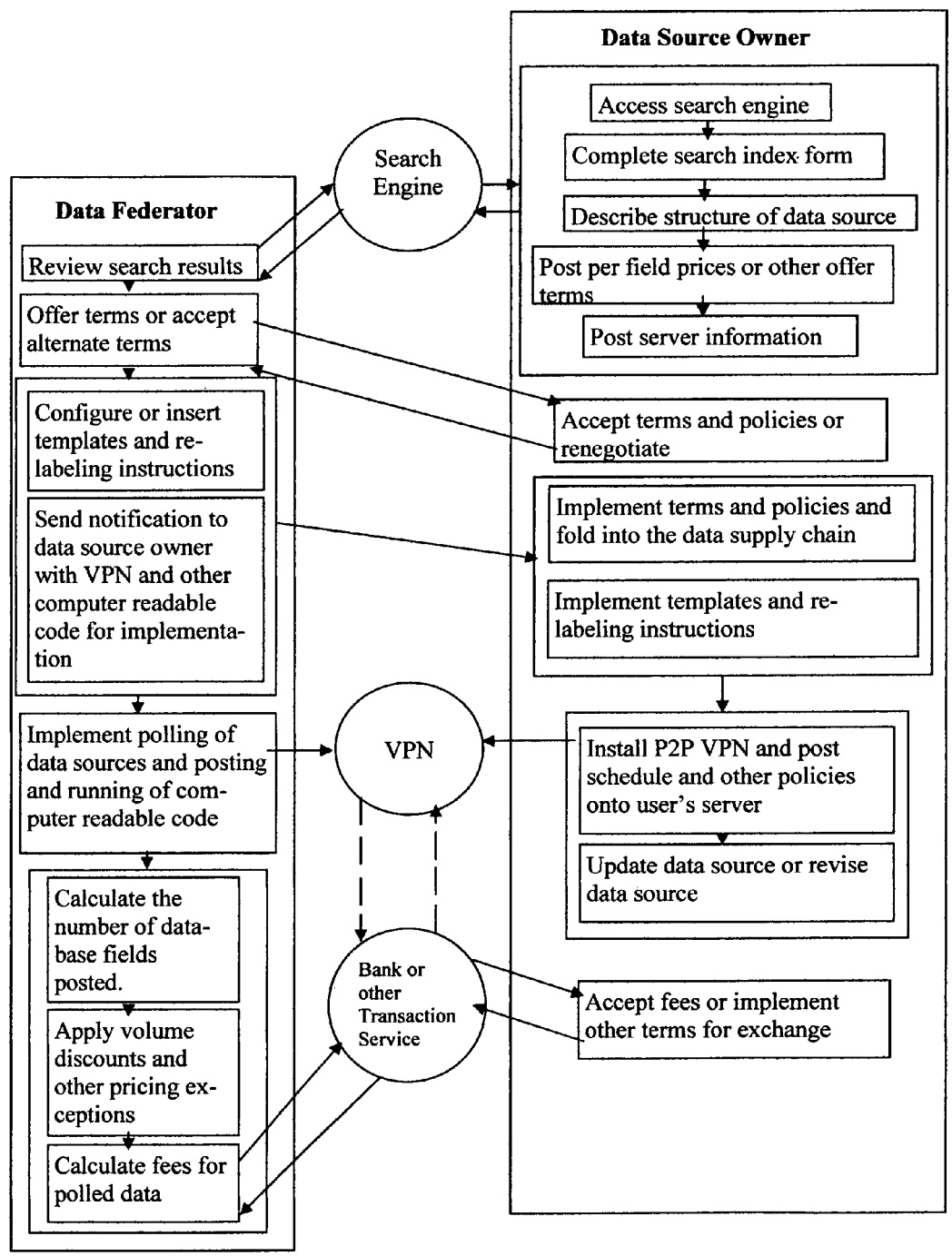

METHOD AND SYSTEM USING SEARCH TERMS TO ACCUMULATE, AGGREGATE AND PRICE DATA FROM A PLURALITY OF DATA ORIGINATORS

BACKGROUND OF THE INVENTION

1. Field of the Invention

There are two primary methods for data accumulation and aggregation. The first is the creation of a centralized data source all users contribute to and all users draw from. One liability of this model, often called an "enterprise" model, is that it requires considerable energy and effort across an entire enterprise to set up forms and formats and determine the fields and data to include. A second liability of the enterprise model is that reporting from an enterprise data source can require many hours of setup and configuration by a centralized IT function. A third disadvantage is that administration is centralized and adding new users and rights can be burdensome or require extra IT resources. The major drawback for enterprise models is rigidity. The major advantage is data integrity and consistency. Another feature of centralized data sources that has been shifting from an advantage to a disadvantage is centralized system security. There is an increasingly strong argument to be made for decentralized, distributed, and redundant data source storage and management.

The second primary method for data accumulation and aggregation is decentralized flexible organic accretion and accumulation of data into temporary or permanent federated data sources. The liabilities of a decentralized method are two-fold. One is low system security unless users access the system through well designed authentication and rights management routines or virtual private networks. The second liability is that the data is in inconsistent formats and structures, so linking one set of data to another may require reconfiguration of one of the sources to match another. Where enterprise data sources can consistently name and tag fields and require that data be input in specified formats or masks, decentralized data management can evolve multiple labels masks and formats for fields; thus making correct assignment, allocation, and linking data with other data sources impractical or time consuming. Overcoming these liabilities, however, will enable much richer exchanges of data across and between data sources.

As the Internet has expanded and enabled users to link to one another through mobile and other devices, the use of a centralized data server has shifted toward decentralized use of a combination of many devices that run computer readable code, each device being capable of operating as a server. As memory capacity in smaller devices has expanded, the need to centralize large data sources on servers with sufficient memory capacity has also decreased. This decentralization of servers and access to servers of various types across business enterprises introduces the possibility for users of computer processing resources to choose to operate individually or in concert. The proliferation of servers that house disconnected data sources and the emergence of cloud computing has also introduced the possibility of combining centralized and decentralized data sources on servers that can exchange data and update one another in real time. The focus of many business methods and systems prior to this patent has been on methods to enable larger enterprises to leverage access to a central data source. Little has been developed to enable owners or originators of small data sources to integrate their data into an organic federated data source. If a data originator has created value through accumulation of data, there is not an easy system or method for receiving payment or other consideration for that value. Peer to peer and other methods of integration and payment or consideration for data from mobile devices and other servers that link data sources into a data supply chain can provide an impetus for advancing an information economy.

Data sources themselves are expanding. The dissemination of social networking, blogging, twittering and other cumulative and accretive venues for data sources in various forms has exploded the volume of available data as well as the forms and formats in which this data is stored. Mining and analyzing data stored in these widely distributed and varied formats could be a tremendous advantage for commercial and for homeland security purposes. Determining who owns the data and how the data should be accessed may sometimes be difficult, but the capacity to do so is essential. While some of these data sources are in the public domain, for other data sources, determining fair market value for data exchange or use is necessary to facilitate exchange and fair use. This invention will facilitate that process.

Methods for tracking access to data sources and server usage and charging for use of server resources or access to data sources have varied. Some of these methods include offering software as a service, calculating the number of data fields accessed, tracking the number of server operations or actions, measuring the Internet bandwidth required, or combinations of the above. As cloud computing and other distributed and multiple sourced data storage capabilities have evolved, an unintended consequence of this decentralization has been the fragmentation of data sources themselves. Many users own data sources useful for their own small subset of business functions or research or logistics assignments, but their data sources are decoupled from other data sources. Information in large public domain data sources such as those provided by the Center for Disease Control or DARPA could be useful for owners of small data sources to compare or contrast with their data source as part of their research or analysis efforts. The field of medical records is a good example of how many data sources of very similar data can remain decoupled and useless for broader research or for use by medical providers in different locations or organizations or disciplines.

Search engines often yield results that are irrelevant or badly formed or inaccurate or from unreliable sources. Users of a data source must vet the data source itself and then clean, organize, attribute, sometimes pay for, and otherwise process the data. Even within a business enterprise, searches of internal data sources may exhibit similar liabilities to data obtained through search engines. Search engines build an index of data sources in order to structure and manage their web crawling and the information they return through their algorithms. In the early days of search engines, web pages were manually registered with the search engine. The advantage of that early model was user control over information about the page itself and structured information about content and potential uses for the page. The convenience and efficiency of web crawlers from major search engine vendors like Google and Yahoo has reduced the use of user driven registration of web pages as a method for populating search indexes. Encouraging or offering an opportunity for active user driven indexing as well as for use of multiple search engines and multiple methods for parsing data sources themselves can help make data sources more available, more targeted, and more useful. Indeed, the need to identify data sources that contain data relevant to a data aggregator or federator is constant and pressing and many formal and informal methods have been developed by researchers and other data aggregators to enable this to occur. This invention, while it uses search engines as an example of a method for identifying relevant data sources, is focused at leveraging every available method or mechanism that identifies relevant data sources for inclusion into a data supply chain or federated data source.

While there may not be a need to charge within an enterprise for access to data, there is an advantage to tracking which users are updating or drawing down data regularly and what data is changing. When data is owned by someone external to an enterprise that could be useful for that enterprise, there is often need to identify and credit the owner, request permission to access and use the data source, perhaps pay for the use of the data, engage in reciprocal sharing of data, or other exchanges. Collaboration among originators of unique data sources is a major hurdle to data users. This invention relates a business method and process for managing the federation, aggregation, and accumulation of data obtained through web searches, and for offering terms or fees or other consideration(s) for access to the data source and use of the data.

2. Description of the Related Art

There is a need to aggregate data and associate data into larger or differently configured or more useful data sources in order for users or owners of data sources to leverage efficiencies and use data for research or risk mitigation or to improve business processes. Spreadsheets and databases enable users to build an almost unlimited number of data sources with their associated formats, field masks, and other features. There are many variations for creating a data source. The most common is the use of computer readable code to produce a spreadsheet or similar tabular structure with data arranged by labeled rows and labeled columns. When data is exported from one data source to another, frequently the conversion is from one tabular format to another tabular format that can be read by or imported into the second data source. SPSS, SAP, Oracle, SAS and other vendors of common formats for data structure will often offer users a set of types of tables and formats to import or to export. Indeed, one of the hurdles for researchers is often converting and importing of data sources from prior researchers into their own data source. Many tables with labeled rows or labeled columns remain isolated from complex business processes because they are never associated with a data source upon which operations are run or from which analyses or reports are drawn or derived. These local data sources may be very useful to their originators to track or monitor small components of business processes and their originators are often motivated to maintain and update them because tracking this data is intrinsic to their daily work process and they have a need to update the data as information available to them changes. This issue of integration and correlation of data sources also applies to non-tabular formats such as documents. Data from formats that are non-tabular usually require extraction of the data from the data source and posting it into a tabular structure. Regardless of format, a data source may hold a value to someone other than an originator and enabling payment or consideration for use or inclusion of that data into a federated data source or data supply chain would be advantageous.

Smith's (U.S. Pat. No. 7,860,760) data supply chain patent teaches how to fold a single data source into a linked set of data sources controlled by an end user. Smith (U.S. Pat. No. 7,860,760) also teaches how to price data per field to include into a data supply chain. However, Smith (U.S. Pat. No. 7,860,760) does not teach how to manage and evolve a data supply chain through exchange or dialog with owners of data sources including extending terms for use of a data source and access to a server housing a data. Smith (U.S. Pat. No. 7,860, 760) does not teach how to implement a business method using search engines and search terms and integrating search results into a data supply chain. Oddo (U.S. Pat. No. 7,222, 090) teaches a method for using key words to parse an HTML page and copy the preceding string. However, Oddo (U.S. Pat. No. 7,222,090) does not address data field types or masks, but focuses on products used in inventory lists rather than data in multiple formats. Franco (U.S. Pat. No. 7,725,366) teaches a supply-chain management system that has a plurality of participants and a focus on just in time management, but the method described is unrelated to data management. Pienkos (U.S. Pat. No. 7,272,572) teaches a handshake style method for agreeing to the exchange of intellectual property where an offer and consideration is extended for agreement. Pienkos (U.S. Pat. No. 7,272,572) further teaches the drawing down of ownership information of the intellectual property from the server housing the intellectual property. The method taught by Pienkos (U.S. Pat. No. 7,272,572) does not include use of search terms and establishes only a single transaction, not a continuous relationship between servers housing or drawing down data sources. Additionally the method taught by Pienkos (U.S. Pat. No. 7,272,572) assumes only transfer of ownership, not an exchange or reciprocal relationship. Strickland (U.S. Pat. No. 7,844,549) teaches a method for exchange in a peer to peer format though it is based on confirming legitimate licensing of the content accessed rather than ownership or copyright. Strickland (U.S. Pat. No. 7,844,549) teaches a complex assignments of credits and debits and also of direct payment, but there is no consideration of continuity or updating of data sources as they are folded into a data supply chain. Yeager (U.S. Pat. No. 7,328,243) teaches use of mobile devices in a peer to peer network to compare and track versions of documents, but does not extend the premise into all data sources linked into a data supply chain and therefore offers no method or process for searching for appropriate data sources.

This method will enable a user to use a search engine or other methods and tools to identify relevant data sources to fold into a data supply chain. Sorting through data sources returned by a search engine or through referral or other sources to determine whether they merit inclusion into a data supply chain and notifying the owner of the data source of interest in the data and extending a request for permission to use the data and then offering a fee or other terms for use of data will facilitate a free market among data source owners, producers, and consumers.

SUMMARY OF THE INVENTION

The present invention is directed to a data source such as a spreadsheet, document, database, blog, Wiki, content management system, social media posts, or other data source housed on any device capable of acting as a server accessible through a search engine or to a search process. It associates actions and events with the search process to generate agreements for pricing or data exchange and actions to be initiated on the server of the first user and the server of a second user (i.e., the user or surrogates of the user) selected by the user. For example, a user may desire to identify data sources distributed on servers all over the Internet or in the "cloud" through a customized set of search terms and to aggregate or federate some of the discovered data with a local data source.

In accordance with the principles of the present invention, a user may insert a set of search terms into a search engine to discover data sources that contain the search terms. While use of a search engine may be a primary method for discovery of data sources, other methods of discovery such as referral or postings on professional association or topic area lists are also methods for discovery. An example of such a search engine is Sciencenet, an experimental peer to peer search engine based on technology developed by Michael Christen using the YaCy open source GPL licensed search engine code. Another example of a search engine using a very different approach to search through documents and other data sources in multiple formats is the GlobaiBrian search engine offered by Brainware. Regardless of the search engine or method used to identify a relevant data source, upon discovery of a data source containing data of use to a data federator, computer readable code will parse the data source and copy a string of text or a count of fields or data types prior to and following the search term or search terms and post these onto the server that originated the search for data sources. Computer readable code will also parse the data source and the server housing the data source for ownership information and post this on the originating server. After the user determines the value of the data source and identifies the structure of the data source, an offer of terms and conditions is created by the user and extended to the owner of the data source. Alternatively, computer readable code may automatically generate the terms for an exchange of data based upon criteria established prior to the search and post these terms for acceptance or rejection by the owner of the data source.

An owner of a data source may actively register a data source into a primary search engine index owned by a user or a third party as a way of inducing or encouraging a potential user to include their data source into a data supply chain. The owner of a data source may include demographic and contact information as well as define the data structure and other cues to enable the primary search engine to better parse the data source through the registration form. The owner of the data source may also include an offer of a provisional terms for use of the data when they register with the primary search engine or accept terms from an offer sheet or catalog of data fees and prices which will automate the exchange without a need for either user to manually input terms or conditions. An owner of a data source may access a server to download computer readable code that will post or calculate terms and fees based upon characteristics of the data source. Terms and fees for use of or access to the data by users other than the first user can also be calculated and posted and accepted or rejected by the data originator.

If an offer is extended by the user and accepted by the owner of the data source through an automatic or a manually driven exchange, the owner of the data source may be provided with computer readable code to facilitate exchange of the data. Additional computer readable code may reconfigure the structure of the data source dynamically or statically on the server to become congruent with other data sources that are part of the data supply chain. Computer readable code to transform and localize the data into formats compatible with data sources on the server of the owner of the data source may also be executed unilaterally or bilaterally. Alternatively, templates for the owner of the data source to use to manually reconfigure the data source may be included in the offer of terms or fees. An additional step may also include the execution of computer readable code by a system of the owner of the data source or on the server hosting the aggregated data to link to banking or other services or systems for the exchange fees or credits. An additional capability may be to utilize the capabilities of peer to peer and other micro banking networks as well as exchanges of credits for services and other exchanges through secure technology identifying the owner and originator. Another step upon acceptance of the terms may be the execution of computer readable code to enable authentication and periodic download or a subscription stream from the server or plurality of servers housing data sources. Permissions and other roles in regard to the data sources may also be implemented. Depending on the implementation, one or more customized actions can be implemented in regard to a data source or set of data sources. Multiple users and owners of multiple data sources will be able to access one another's data sources and exchange fees or other considerations for use of these data sources.

In one embodiment, the invention is a web server configured to provide access to a user via a web based user interface into which search terms are entered and processed and then reported or posted. The web server also comprises a GUI along with computer readable code that accepts search terms, initiates a search engine, collects information from servers and data sources returned by the search engine, extends or posts an offer of terms to the owner of the data source, connects to the website housing the data source to run computer readable code to authenticates across both servers, may execute computer readable code to reconfigure the data source into a format compatible with the user's data source, and schedules pushing and pulling data from either data source upon various conditions. Thus, data may be gathered by the user or the user's surrogates connected to the Internet or an intranet or combinations of both the Internet and intranets in real time. Computer readable code that includes wizards and setup processes to configure the data collection protocols and the user rights and roles and authentication across servers are also part of this embodiment.

In another embodiment, such as a local network, notification of terms is sent to the owner of the data source through the network and processing proceeds in the same manner as it does for a website user. This variant of the business method adds a capacity to identify and track the volume and quality of data entered into various data sources over time in order to determine service volumes or other potential cost or profit centers, such as research productivity. Data collection, entry and adjustment are thereby folded into business metrics.

In another embodiment, the present invention is a method for configuring a macro database of federated data sources that can be mined by many users for inadvertent or heretofore unknown or unconsidered relationships or connections or interactions. This is a partial solution to the issue in risk management and assessment that is reflected by the phrase "connecting the dots." A user who has aggregated multiple data sources through using a search engine or other method to identify relevant data sources and retained strings of information preceding and following the data or search terms will be able to use pattern recognition tools and other methods to discover unanticipated interactions and connections. In this embodiment, the potential for many users and producers of data to engage in collaborative exchanges and networks will be achieved. One option in this embodiment is the use of peer to peer banking or exchanges of credits through a peer to peer virtual private network or through typical connections with banking services for exchange of fees.

In another embodiment, an owner of a data source registers the data source with a search engine provided by a user and includes demographic information, information about the structure of the data source, and terms or prices for use of the data source. The act of registration of the data source also serves as an invitation to a user to connect to the server housing the data source and execute computer readable code to connect the data source into a data supply chain.

Many embodiments of this invention leverage the advantage of membership in a data supply chain by enabling an owner of a data source discovered through a search engine or other method or tool to identify relevant data sources to permit the originator of the search for a relevant data source to execute computer readable code directly upon the server housing the data source.

BRIEF DESCRIPTION OF THE DRAWINGS

Other aspects, features, and advantages of the present invention will become more fully apparent from the following detailed description, the appended claims, and the accompanying drawings in which:

FIG. 2 shows a diagram representing exemplary processing implementing the invention focusing on the first user of the originating server and components of the system or method;

FIG. 3 shows a diagram representing exemplary processing implementing the invention focusing on a second user of the discovered server housing a data source and components of the system or method;

FIG. 4 is a diagram illustrating various components in accordance with one embodiment of the present invention focusing on the relationship and interaction of the user with the server, the data source, the search terms, and the aggregated or federated data sources;

FIG. 5 is a diagram illustrating various components in accordance with one embodiment of the present invention as it calculates fees and performs other tasks according to the method of the invention herein;

FIG. 6 is a diagram illustrating various components in accordance with one embodiment of the present invention as it populates entries into a search engine index and links data sources into a data supply chain and implements and utilizes a VPN among the users of the data supply chain and interacts with an external system such as a bank for extending payment or other consideration.

DETAILED DESCRIPTION OF THE INVENTION AND PREFERRED EMBODIMENTS THEREOF

Figure 1:
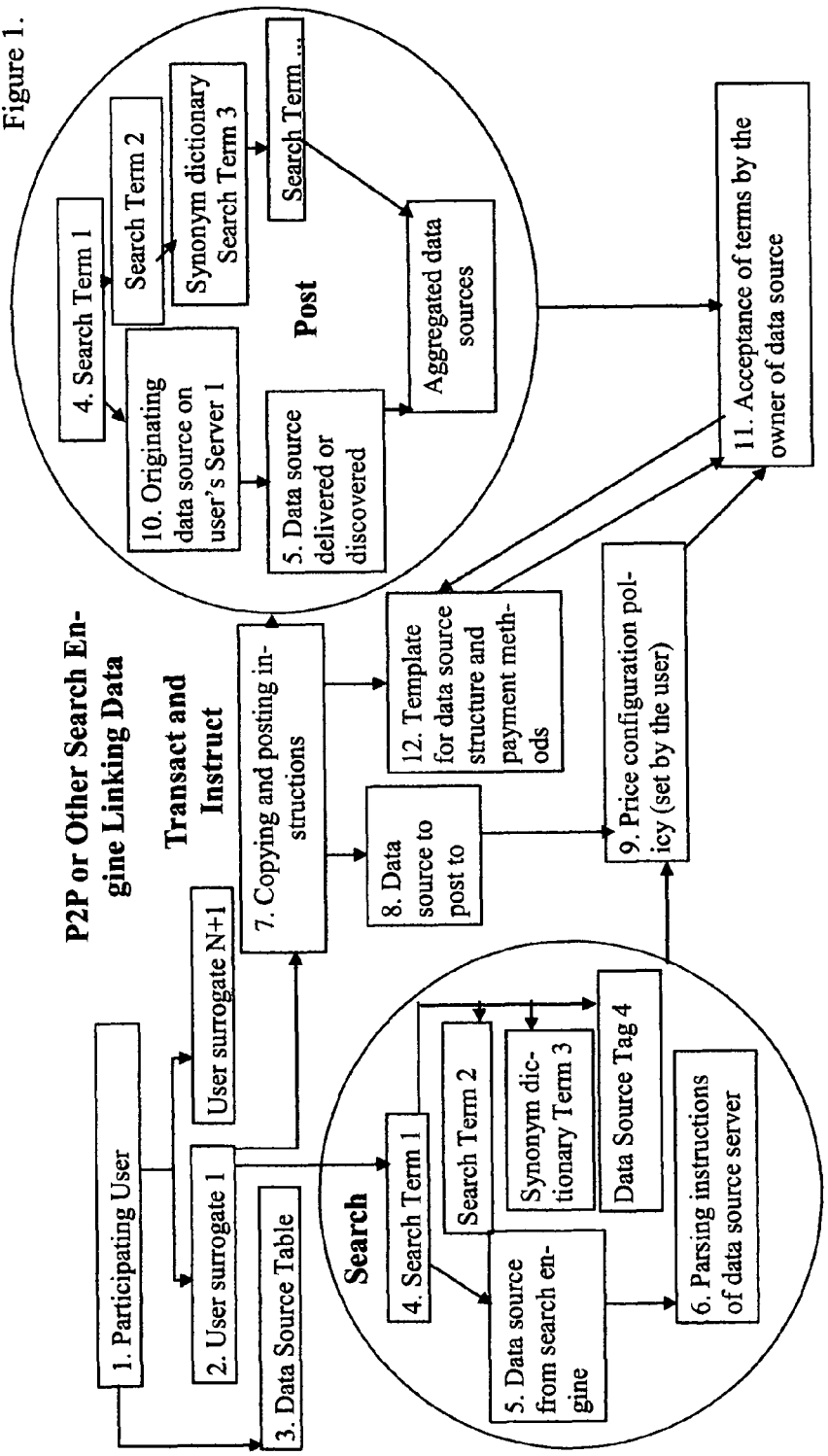
FIG. 1 is a diagram illustrating various components in accordance with one embodiment of the present invention focusing on the search engine.

The present invention is a business method and system wherein one or more data sources where relevant data is discovered which is housed on a separate server that would benefit the user by being included into a data supply chain. Data drawn from a data source is evaluated for utility and an offer is made to the owner of the data source for use of the data at specified times in specified formats at specified prices or other terms.

The user will build a search term configuration profile in accordance with the present invention. This search term configuration file specifies terms or words to be associated with the data fields to be accumulated; data entry and edit rights and roles for the user and the user's surrogates; forms and formats for capturing, reporting, structuring and calculating data entered; rules to trigger notifications; rules to configure and generate payment or other actions; rules and processes to configure access and authentication on servers of data sources for the user and the user's surrogates; rules or procedures o use to build an algorithm to capture contextual data from a data source; and rules to apply to social networking sites or individual users. For example, a user may create a search term profile which will search for fields containing the term "potassium" and "cardiac" or "heart" and "0.3 mg" that searches the Internet weekly at 6:00 AM. The configuration profile may include more than one set of terms. For example, the search configuration profile may also include "admitted," "Physician," "perspiration," and "nausea."

According to the principles of the present invention, a user creates a search term configuration profile which may include additional criteria and actions upon a discovered data source, such as string lengths and counts of data types to precede or follow the search term or one or a plurality of algorithms to capture contextual data from a discovered data source. The search term configuration profile may also specify a format for capturing and posting onto the user's server ownership information of the data source and which social network or cloud computing services vendor or other provider housing a data source is associated with the site discovered through the search engine or through any other method to tag relevant data sources. The user has the option of generating price lists and sheets manually or automatically to set data exchange terms and to post these into a notification to the data source owner or execute computer readable code to post terms for the data source owner to accept through other server driven communication methods.

The web server or a network-based server owned or managed by a user stores the search terms configuration profiles and posts data returned through searches onto the user's server. The search term configuration profiles may also automatically post computer readable and executable code, sometimes known as "bots" into a notification of the data source owner. The web-server or network-based server may automatically deliver notifications. However, the user may override the terms in the "offer" of inclusion of a data source into the data supply chain in order to manage costs and address other business considerations. The owner of the data supply chain or the first user may review data returned through searches to confirm that the data source has sufficient value or use an automated ranking or pricing algorithm to assign a weight or value to the owner or originator of the data source or to the data contained within the data source. This is sometimes known as "reputation" rating and may enable a user to include a weighting of the data returned as it is posted into the data supply chain and also to adjust calculation of the price or terms for data returned from a data source.

It is also anticipated that there may be a need to re-format the data. Re-tagging or re-labeling of column or row labels, fields, or other terms used across data sources may be necessary. An example of a column or row requiring re-labeling might be a conversion of columns labeled "Chemical" to "Element." An example of a row or field that might need re-labeling is that the capital letter "K" can also represent "potassium." For data sources that are in other languages, there also will be significant variation in the name of a data point or data tag. Dictionaries of synonyms may be included into the search term configuration profile to enable alternately labeled data to be returned for review by the user. If the preferred term is indicated by the user, computer readable code will convert the alternate terms into the preferred terms.

As data and fields returned from a search or a referral or other method used to discover an eligible data source are posted into the data supply chain, computer readable code calculates the cumulative fees due to the owner of the data source and may initiate a banking or other financial transaction aligned with the terms agreed to for the data exchange. The principles of the present invention provide users and/or service providers flexibility to improve upon their existing data structures. To improve the quality of the data and the utility of the data, implementation of data entry protocols or formats for "best of class" templates for types of datasets may be required of the owner of the data source by the user prior to initiation of the data exchange and accumulation process.

Collaborating researchers who opt to share their protocols and search terms and referral and other data source discovery methods may also contribute data formats, protocols, templates and policies that form a library to draw from for data originators.

The user may also have the option of improving upon the existing service by enabling other enrichment of the data exchange process such as searching remote devices like smart phones or gaming consoles. For example, the user may direct searches to any device that has Internet access. The principles of the invention may be expanded to enhance other data services provided by the service provider, e.g., the service provider may append applications that further enrich the quality utility and ease for drawing down or using data, such as scheduling tools, advanced calculation or analytic tools, advanced reporting tools, dashboards, pricing or exchange algorithms, and other collaborative infrastructure tools and resources. A more detailed description of the drawings follows:

FIG. 1 is a diagram of one embodiment of the present invention. In this embodiment, the principles of the present invention are illustrated in the context of a search engine to access and configure the search terms to post data fields that will be included into a data supply chain. Three groups are indicated. The group that is not encircled represents transactions among entities. The group in the left circle represents search engine activities and instructions and policies. The group in the circle on the right represents the posting activities, policies and instructions.

A (1) User participating in a data supply chain with access to a search engine in accordance with the principles of the present invention is connected to the search engine via a server or similar device used for accessing the Internet. The search engine may be any search engine. The user must be a participant in the data supply chain with rights to use computer readable code that drives this invention. In general, such users will usually be a researcher or participant in a business process.

The (1) User has registered as a Participant in the data supply chain and entered contact and billing information as well as identified his (2) Surrogates and assigned them to roles or positions. The (1) User also defines his (4) Data Source Table (4) Search Terms or (4) Synonym Dictionary sets or (4) Data sources and assigns these in various configurations to his surrogates. The (1) User establishes his (7) Data Input Instructions or his (7) Data Types and Strings and Conditions and configures each (8) Data Source or (8) Template. Through configuring the Data Sources and Templates the user builds a data supply chain protocol or policy set. The (1) User may, at this stage, elect to connect particular (2) Surrogates with further (7) Data Types and Strings to establish relationships between them for posting into the data supply chain.

The (1) User now builds his (9) Price Configuration and Calculation and Notification Policy Set for relationship among different components of the invention. The (9) Policy Set links back to the (4) Search Tem(s) established by the (1) User and establishes business rules for accessing the invention and connecting (4) Data Sources and provides (6) parsing instructions for a data source to enable identification of the owner to post into the results along with data fields and strings discovered through the search or by an algorithm to capture contextual data from a data source. The (9) Price Configuration and calculation and notification Construction Policy Set additionally is linked by the (1) User to one or more (10) Originating Data Sources on the User's Server. The connection to the (10) Originating Data Sources, the (5) Data Sources Discovered with the (11) Acceptance by the owner of the discovered data source of the (9) Price Configuration and Calculation and Notification Policy Set is also applied to the calculation of fees for the data and may initiate computer readable code to push or pull the data across the two servers. (11) Acceptance by the owner of the discovered data source also enables the posting of (12) Template(s) for shaping the dataset on the originating server to conform to the requirements of the user of the data supply chain.

As the User builds relationships between policies and searches, and policies and data originators and policies and search fields and strings along with synonyms and templates, the data supply chain emerges. As results are posted across servers, the (9) Price Configuration and Calculation and Notification policy is implemented and the owner of the originating dataset is compensated as instructed.

The (1) User has tremendous flexibility in creating a configuration profile for the search terms and methods and kinds of sites to include in the data supply chain. In one implementation, the user is presented with a series of graphical user interfaces (GUIs) through a social network asking the user to enter or select preferences through a wizard driven interface; but there are other possible embodiments of the invention including tabular, drop down selection, and radio button selections that can configure the implementation of the invention.

After the search and posting and payment process has been implemented, it can be propagated to other users or surrogates assigned rights within the data supply chain congruent with the Policy set. It can also be ported into other devices such as mobile phones or game systems or tablet computers or any device that may be connected to the Internet or the "cloud."

FIG. 2 shows a Diagram of the Relationships between Search Terms, Data Sources, Data Owners, and Data Pricing for posting into the table or set of data supply chain search terms and inclusion into the data source updating process illustrated in FIG. 1 according to one embodiment of the present invention. As shown in FIG. 2, the First User creates a (1) User Defined Policy Set that establishes a set of (2) Search Terms posted into a search engine. There can be multiple (3) Data Servers accessed through a search engine seeking the Search Terms. Each discovery of a (4) Data Source containing a search term leads to the identification of the (4) Data Source Owner and information on the device or server regarding the server itself and the owner of the data source. When this is returned to the User, (5) prices or terms or weights for each search term returned and the (7) Data Tables to be folded into the Data Supply Chain are associated with the (4) Data Source Owner. The user then may push to the (3) Data Source in accordance with the (8) Polling instruction and computer readable code to push or pull the data. In the Data Aggregator on the First User's Server (9) are the (7) Data Tables associated with the (6) search terms and the (10) Data Fields with their (11) Associated prices or value(s). The (6) Search Terms and their correlated (10) Data Fields are housed in a (12) Polling List that lists the (3) Data Sources to be retained and polled. A (13) Data Source polling schedule is built to structure polling of data sources and then (14) Templates or formats for the data are offered to the owner of the data source.

The (1) First User Defined Policy Set is the set of instructions that links the access rights and all other policies together. Note that the (6) Search Term on the user's server is always associated with the (7) Data Table, the (10) Data Field and its (11) Value or Price.

FIG. 3 shows a diagram representing exemplary processing implemented within the embodiment of the invention. It is designed to show user interactions through the actions and events on their servers.

FIG. 4 shows a diagram representing exemplary processing implemented within the embodiment of the invention. It is designed to show user interactions with the aggregated data supply chain, users, policy sets and conditions, prices, weights, polling instructions, templates and string or posting instructions derived through implementation of an algorithm to capture contextual data from a data source for implementation through a search engine or other data source discovery method.

FIG. 5 shows additional details of how the flow of the data aggregation process proceeds.

FIG. 6 shows how a data federator and a data source owner may interact through the subsets of activities related to a search or other data source discovery process, to a VPN or other authentication method for access and exchange, and to a bank or other service for exchange of fess or credits or other consideration(s). The dashed lines represent the use of the peer to peer VPN network as part of the payment processing method.

The principles of the present invention are flexible. For example, searches or other methods for discovery of relevant data sources may be performed in real-time or queued on a user server to be performed at a specified time. Users may create provisional or test configuration profiles. It should be noted that the user can build and accumulate additional Policy Sets to enable computer readable code to manage many or even all aspects of the user's data supply chain. The user has flexibility to change the policy sets in the configuration profile. For example, the user may elect to change the times or content of a search or posting. The changes may be made in a variety of ways. For example, the user may access a calendar (not shown) to select a year, month, and day corresponding to a new specified time. The user may select the specified time with even more precision (e.g., hours and minutes) by using a time-of-day filed within the calendar.

The user may request changes in the selection of the target for notifications, e.g., change the routing of a notification from a data source owner to a person interested in the information captured by the data source originator. The user also has flexibility in selecting a desired format for these postings. Depending on the implementation, the user may have drop down or other selection options to initiate access to formats or to targets or to actions or events.

Also, the principles of the invention include providing control capabilities to the user to control and manage re-formatting to be used for the data fields. For one user a data field label may be "On Base Percentage", and for another user the label for the same kind of field calculated the same way with the same policy set associated with it may be labeled "OBP."

In addition to the embodiments described above, the present invention may be applied to a variety of other configurations. For example, although the invention has been primarily described in the context of the world-wide web, the invention can also be implemented in the context of other types of computer networks, including intranets. The present invention can also be implemented in the context of accessing a server that is not a part of a larger network.

It will be further understood that various changes in the details, components, and arrangements of the parts which have been described and illustrated in order to explain the nature of this invention may be made by those skilled in the art without departing from the principle and scope of the invention as expressed in the claims.

The invention claimed is:

1. A method and system for acquiring and linking a plurality of data sources wherein a data source or the plurality of data sources is accessed through inputting search terms into a search engine or other data source discovery method, resource, or tool, said method comprising;

setting up a collection of data sources on a server by a first user;

setting up one or a plurality of the search terms for posting into the search engine or said other data source discovery method;

setting up an algorithm to capture contextual data from a data source from the collection of data sources for implementation through the search engine or said other data source discovery method;

setting up additional search term alternatives by appending terms from a synonym dictionary or other dictionaries for the search term or the plurality of search terms;

accessing a peer to peer search engine or other search engine or said other data source discovery method by the first user;

posting or inserting the search terms or the plurality of search terms into the search engine or said other data source discovery method;

setting by the first user instructions schedule(s) or condition(s) for implementing a search by the first user;

initiating the search from the peer to peer search engine or the other search engine(s) or a plurality of search engines or said other data source discovery methods from the server associated with the first user;

executing said algorithm to collect contextual data about the data source from fields or strings near the search term;

posting prices or terms and conditions for the use or exchange of the configured search terms;

discovering ownership of the server housing a data source;

posting into the collection of data sources associated with the first user the ownership information of the server, the data source web address, and the ownership or copyright information for the data source, acceptance of fees, terms and conditions;

posting into the collection of data sources associated with the first user the associated search term or plurality of search terms returned by the search engine or said other data source discovery method;

posting copied fields or data to the collection of data sources on the server associated with the first user;

assigning by the first user or by computer readable code a value or weight to the data sources or data fields returned by the search engine or other said other data source discovery method from the data source of a second user;

accepting or determining a fee for each data source associated with said second user per use of one or a plurality of fields within the data source;

creating an email or other notification message addressed to said second user or owner of rights to the data source;

inserting into the notification the fee or price or terms offered or automatically endorsed by the owner of the data source for rights to access or copy from the data source;

inserting the fee or price or terms for other users of the data copied from the data source into the notification;

inserting computer readable code or data structure templates into the notification to re-format, transform, localize, or reconfigure the data source of said second user;

inserting computer readable code into the notification to enable a link between the servers associated with the first user and the second user.

2. The method of claim 1 wherein new entries or changes to entries in a data source by the first user or said second user may trigger upon either server:

accepting input from either user of terms for use of a data source owned by either user;

enabling authentication and polling of data by either user;

modifying one or the plurality of data sources; and executing one or a plurality of actions upon one or the plurality of data sources.

3. The method of claim 1 wherein rights to access and copy from a data source may be assigned to others users.

4. The method of claim 1 wherein rights to access and copy from a data source may be propagated through a user network, a social network, trust network, professional organization, or other network.

5. The method of claim 1 wherein the first user or the second user may specify whether access to data sources is reciprocal or one-way.

6. The method of claim 1 wherein new entries or changes to entries into a data source by the first user or the second user may be tracked and monitored to reconfigure pricing terms or implement other metrics.

7. The method of claim 1 wherein an owner of a data source may register a data source into a search engine index or other data source listing index of the first user and specify characteristics of a data source, the ownership of the data source, and terms for use of a data source.

8. The method of claim 1 wherein an owner of a data source may accept an automated calculation of an offer of terms or conditions or fees upon the search engine or said other data source discovery method discovering search terms associated with a data source.

9. The method of claim 1 wherein the first user may convert or transform federated data or a subset of the federated data into an alternate format and propagate that alternate format to the second user or data source owner.

10. The method of claim 1 wherein the first user may run computer readable code upon a server to implement banking transactions or other exchanges for credits or consideration for use or access to a data source of the second user.

* * * * *